United States Patent [19]

Carroll

[11] Patent Number: 5,548,177
[45] Date of Patent: Aug. 20, 1996

[54] PIEZOELECTRIC GENERATOR PROTECTION

[75] Inventor: Charles B. Carroll, W. Windsor Tsp., N.J.

[73] Assignee: Ocean Power Technologies, Inc, West Trenton, N.J.

[21] Appl. No.: 388,559

[22] Filed: Feb. 14, 1995

[51] Int. Cl.⁶ .................................................. H01L 41/08
[52] U.S. Cl. .......................... 310/339; 60/497; 290/53; 310/800
[58] Field of Search .................................. 310/328, 329, 310/338, 339, 800; 290/53, 42; 60/497, 495

[56] References Cited

U.S. PATENT DOCUMENTS

| | | | |
|---|---|---|---|
| 3,760,402 | 9/1973 | Magerle et al. | 310/339 X |
| 4,110,630 | 8/1978 | Hendel | 290/53 |
| 4,317,047 | 2/1982 | de Almada | 290/53 |
| 4,404,490 | 9/1983 | Taylor et al. | 310/339 |
| 4,685,296 | 8/1987 | Burns | 60/497 |
| 4,742,241 | 3/1988 | Melvin | 290/53 |
| 4,843,275 | 6/1989 | Radice | 310/800 X |

*Primary Examiner*—Mark O. Budd
*Attorney, Agent, or Firm*—Michael Y. Epstein

[57] ABSTRACT

A known type of piezoelectric power generating system for converting the mechanical energy of waves on a body of water comprises a float and a piezoelectric power generating element suspended, under tension, between the float and a bottom anchor. For preventing excessive vertical stretching of the piezoelectric element in response to the presence of excessively high waves, a protective element is coupled between the float and the bottom anchor for effectively limiting the rise of the float above a preselected height corresponding to the maximum straining desired for the piezoelectric element. The coupling is automatic and occurs only at those instances when the piezoelectric element elongation is approaching its maximum amount, and automatic decoupling occurs immediately upon the float falling to a height where non-excessive straining occurs.

12 Claims, 2 Drawing Sheets

PIEZOELECTRIC GENERATOR PROTECTION

BACKGROUND OF THE INVENTION

This invention relates to the generation of electrical power by piezoelectric generators, and particularly to the protection of such generators against excessive strains during use.

U.S. Pat. No. 4,685,296, to Burns, the subject matter of which is incorporated herein by reference, discloses a piezoelectric power generating system comprising a float on a surface of a body of water, e.g., an ocean, and a piezoelectric power generator suspended from the float and anchored, under tension, to the ocean floor. The generator is alternately strained and destrained in response to up and down movements of the float in response to passing waves and generates electrical power in relation to the range of such straining and destraining.

For maximum power generating capacity, the system is preferably designed such that the range of straining during normal use is close to the maximum allowable straining of the generators without damage. The range of straining is a function of the heights of the passing waves, and in conditions of unusually high waves, a danger exists that the piezoelectric elements are over strained and damaged. Accordingly, a need exists for preventing, preferably completely automatically and instantaneously, excessive straining of the piezoelectric generator in response to waves of excessive heights.

SUMMARY OF THE INVENTION

A piezoelectric power generating system comprises a float for use in a body of water for up/down movements in response to passing waves. A piezoelectric power element is elastically suspended between the float and the water bottom and is subjected to varying vertical strains in response to float vertical movements. For protecting the piezoelectric element against destructively excessive strains in response to unusually large waves, a stress absorbing member, substantially more rigid than the piezoelectric element, is provided substantially in parallel with the piezoelectric element but inoperable for absorbing float induced stresses until the straining of the piezoelectric element reaches a preselected amount.

In one embodiment, the stress absorbing member is a strong, flexible cable extending between the float and a firm anchorage. The cable is of such length as to hang slack until the vertical elongation of the piezoelectric element reaches a preselected amount, at which time the cable becomes taut for substantially or significantly restraining further vertical rise of the float regardless of the height of the passing waves.

In a second embodiment, the stress absorbing member is a rigid member firmly anchored against vertical movement and disposed parallel to and adjacent to the upper end of the piezoelectric element. A stress transferring element, e.g., a solid bar, is securely fastened to the generator upper end and is freely vertically movable relative to the stress absorbing member, e.g., within a vertical slot therein. At a height corresponding to the maximum desired vertical stretching of the piezoelectric element, the stress transfer element engages a stop, e.g., the upper end of the slot, for transferring the float induced stress to the stress absorbing member for preventing further straining of the piezoelectric element.

DESCRIPTION OF THE DRAWING

The drawings are schematic and are not to scale.

DESCRIPTION OF PREFERRED EMBODIMENTS OF THE INVENTION

Figure 1:
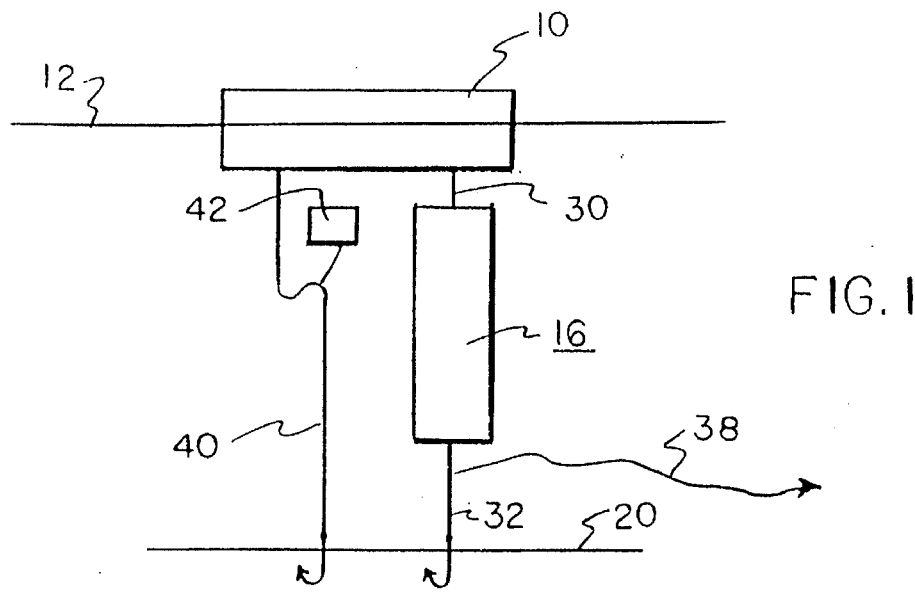
FIG. 1 is an elevational view of a power generating system according to the invention disposed within a body of water.

With reference to FIG. 1, a basic piezoelectric power generating system is shown.

The system includes a float 10 floating on a surface 12 of a body of water, e.g., an ocean, and a piezoelectric power generating element 16 suspended from the float and anchored, under tension, to the ocean floor 20. Although not shown, a plurality of power generating elements can be suspended, in parallel, from the float 10.

Such systems are now known and a specific example thereof is described in the afore-cited patent to Burns.

In one use of such systems, the length of the piezoelectric element 16 is selected so that at mean water level, corresponding to the water level with an absolutely calm and flat surface 12, the piezoelectric element is under some degree of tension, e.g., an amount sufficient to strain (i.e., vertically stretch) the element to about one-half of the permitted or selected maximum straining of the element. Then, in response to passing waves, as the float is first lifted by a wave, the piezoelectric element 16 is first further strained and, as the wave passes, the element is destrained until, when the float is at its lowermost position in the trough of a wave, the element 16 is almost completely without strain. During changes in the straining of the piezoelectric element 16 electrical power is generated which is collected by electrodes included within the element.

Details of various piezoelectric power generating elements or modules are generally known. Also, any number of different elements using different piezoelectric materials can be used.

Figure 2:
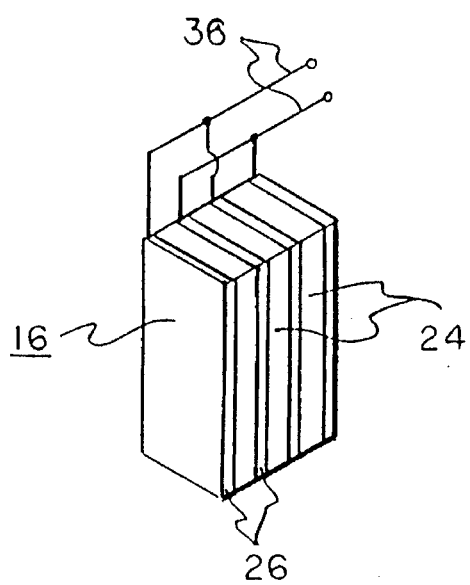
FIG. 2 is a perspective view of a power generating element usable in the system shown in FIG. 1.

A presently preferred piezoelectric element is in the form of (FIG. 2) an elongated, beam 16 having a rectangular cross-section. The beam is formed from a plurality of electroded, stacked sheets 24 of PVDF with the various sheets bonded together by means of intermediate layers 26 of a flexible adhesive, e.g., DENSIL 1078, manufactured by FLEXCON Corporation. The sheet electrodes can comprise known conductive inks including, for example, carbon or silver. Other known piezoelectric elements can be used.

PVDF is a known plastic-like material commonly used as a dielectric in capacitors. When properly "poled", i.e., with its electric dipoles frozen in mutual alignment, the PVDF material has piezoelectric characteristics. Both the fabrication of PVDF material in poled, electroded sheet-like form and the use of such material as a piezoelectric transducer are known. For use in systems of the type herein disclosed, i.e., as an elongated beam formed from stacked together sheets lying in planes parallel to the beam axis of elongation, the piezoelectric sheets are of the type wherein straining and destraining of the sheets in directions parallel to the main surfaces thereof generates electrical voltages in perpendicular directions, i.e., between the main surfaces thereof.

In use, a beam 16 (FIG. 1) of such PVDF (or other) material is suspended by an upper cable 30 from the float 10 and anchored by a lower cable 32. Electrical terminals 36 (FIG. 2) are provided for making electrical connections to the various electrodes within the beam element 16 for extracting generated electrical energy therefrom. Such terminals, for example, can be secured to the lower cable 36 and branch therefrom in a separate cable 38 for transmitting the electrical power.

As previously noted, basic piezoelectric power generating systems are generally known, and the present invention is directed to means for preventing physical damage thereto in conditions of excessively large waves.

As above-described, the piezoelectric element 16 is suspended, under tension, between the float 10 and the floor 20. With beams 16 of PVDF material, as presently preferred, safe and prolonged operation, i.e., for avoiding degradation of either the physical or electrical characteristics of the beam elements 16, requires that the beams not be strained in excess of 6%. For maximum energy output of the system, the beams are preferably strained as high as possible and, in one arrangement, the systems are designed such that, under normal conditions, the elements 16 experience repeated strains of around 4%.

The actual amount of straining that occurs is a function of the heights of the passing waves. Accordingly, the system is designed to experience such 4% straining in response to the most prevalent wave conditions. When lower height waves are present, the system generates less than maximum power. When higher waves are present, greater amounts of power are generated but, with excessively large waves, the element 16 can be over-strained, thereby damaging it.

An obvious protective means is a stress fuse type element, i.e., a link disposed in the upper cable 30 that breaks when the stress therethrough exceeds a certain limit. A problem with this, however, is that such a simple stress fuse completely disconnects the system until the fuse link is replaced.

The present invention avoids this disconnect problem and serves not only to protect the system against excessive strains, but in a manner which allows continued use of the system and collection of power therefrom even during excessively high wave periods while the protection system is functioning.

The basic concept of the protection system is shown in FIG. 1. In addition to the piezoelectric generator system previously described, there is provided a flexible, but quite rigid and strong cable 40 suspended from the float 10 and firmly anchored to the floor 20. FIG. 1 shows the condition at mean water level and with a perfectly flat, waveless surface 12. In this condition, the piezoelectric element 16 is under a preselected amount of strain, e.g., 2%. Conversely, the cable 40 is sufficiently long as to be slack and to be under no strain except that caused by its weight. FIG. 1 also shows the use of a separate, submerged float 42 which is optionally used for supporting the weight of the cable 40.

In operation, in the presence of surface waves, as the float 10 is lifted by a passing wave, the upward motion further strains (elongates) the piezoelectric element (or elements) 16 thereby generating electrical power. Provided the straining of the element 16 remains below a preselected, safe level, the protective cable 40 remains slack and absorbs no float induced stresses. With excessively high waves, however, tending to raise the float to a height causing excessive straining of the element 16, i.e., straining in excess of the preselected level, the slack in the cable is completely taken up and the cable comes under tension and begins to share, with the element 16, the float induced stress.

The amount of further elongative straining of the element 16 is a function of the modulus of elasticity of the cable 40. This, of course, is a matter of choice, and in one embodiment, the cable 40 is so stiff as to prevent any significant further lifting of the float regardless of the height of the passing wave. Thus, at the instant the straining of the element 16 reaches a preselected amount, corresponding to when the slack in the cable 40 is completely taken up, further upward lifting of the float, and further straining of the element 16, substantially ceases. Thus, overstraining of the element 16 is avoided.

The amount of stress on the protective cable is a function of the volume of the float. In the absence of any restraint, the float tends to rise and fall with the passing waves. However, in the present arrangement, when the float tries to rise with a wave, it is pulled down in the water by its anchoring means. When the float is pulled down, i.e., restrained from rising, it becomes increasing submerged by the rising water and the force required to prevent rise of the float is equal to the weight of the increased amount of water displaced by the float. During normal operation, some lifting of the float occurs as the piezoelectric element 16 is stretched, but once the cable 40 becomes taut, further lifting of the float substantially ceases. The force extended by the float on the cable 40 increases until such time as the float is completely submerged. After complete submergence, only a little more force is required to pull it deeper (relative to the continuing rising water) because all of its volume has already displaced water and only drag against the rising water must be overcome. Accordingly, regardless of the heights of the waves, the system can be designed to produce a known maximum stress in the protective cable 40.

Excessively high waves include excessively shallow troughs. This poses no problem because both the cable 40 and the element 16 become slack and remain safely submerged beneath the water surface.

The protective system described, in spite of its simplicity, provides significant and unexpected benefits.

Firstly, it protects against excessive straining of the piezoelectric element. As described, this can be accomplished by abruptly preventing further rise of the float 10 when the protective cable 40 first comes under tension. Typically, the protective cable 40, e.g., of twisted steel wires, will have some elasticity and, depending upon the overall design considerations of the system, more or less additional straining of the element 16 can occur. However, precise control of the amount of maximum strain is easily controlled because, as above-described, once the float is completely submerged, no additional stresses are generated regardless of how deeply submerged becomes the float.

A further benefit is that the protective system is always in place for automatic operation without interfering with normal operation of the system. Thus, with normal waves, the slack, protective cable 40 has no effect on system operation. With excessively high waves, the desired protection is provided which is automatically discontinued when the waves return to normal size.

Additionally, the protective system provides the unusual benefit of allowing uninterrupted operation of the system in extremely severe storm conditions where, in most ocean environments, e.g., off-shore oil drilling platforms, normal operations must cease. Thus, even with extremely high waves, as the float 10 begins to lift above the mean water level, straining of the piezoelectric element occurs exactly as with normal height waves, and the straining is discontinued only when the preselected maximum straining is reached.

Thereafter, further lifting of the float 10 is prevented by the protective cable 40 and the float can be completely submerged. During the time further lifting of the float is prevented by the taut cable 40, the straining of the element 16 remains constant and the system temporarily stops generating power. Then, as the wave crest passes, the float eventually descends to a level where the protective cable 40 looses tension and contraction of the elongated piezoelectric element occurs. Such contraction, i.e., destraining of the element, causes generation of electrical energy until such time, with unusually deep wave troughs, the element 16 loses all strain and the element supporting cables 30 and 32 become slack. Generation of electrical energy also stops during this non-strained condition of the element 16 but resumes after the wave trough has passed and the float 10 again begins to rise. Thus, even under conditions of extremely large waves, the system continues to generate energy during those periods when the height of the float is within the normal range of operation.

In effect, the system automatically "detects" when the piezoelectric element is under normal strain, and allows the system to generate electricity, and only interferes with normal operation during those periodic time periods when the element 16 is otherwise subject to being damaged.

The electrical power generated by the systems is a function both of the amplitude of the straining of the element and the frequency thereof which is a function of the frequency of the passing waves. Thus, even under severe wave conditions, resulting in discontinuous electrical generation, as above-described, significant power generation still can be obtained dependent upon the frequency of the passing waves.

Figure 3:
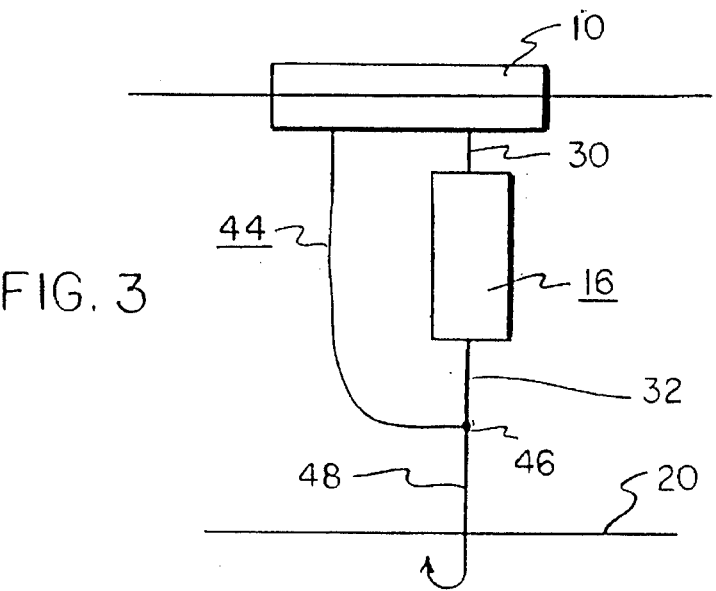
FIG. 3 shows a modification of the FIG. 1 system.

FIG. 3 shows a modification wherein a protective cable 44 serves the additional function of anchoring the piezoelectric power generating element 16 to the floor.

The slack in the protective cable 44 allowing its automatic coupling and decoupling is present between the float 10 and the point 46 of attachment between the piezoelectric element lower end cable 32 and a lower portion 48 of the protective cable.

Figure 4:
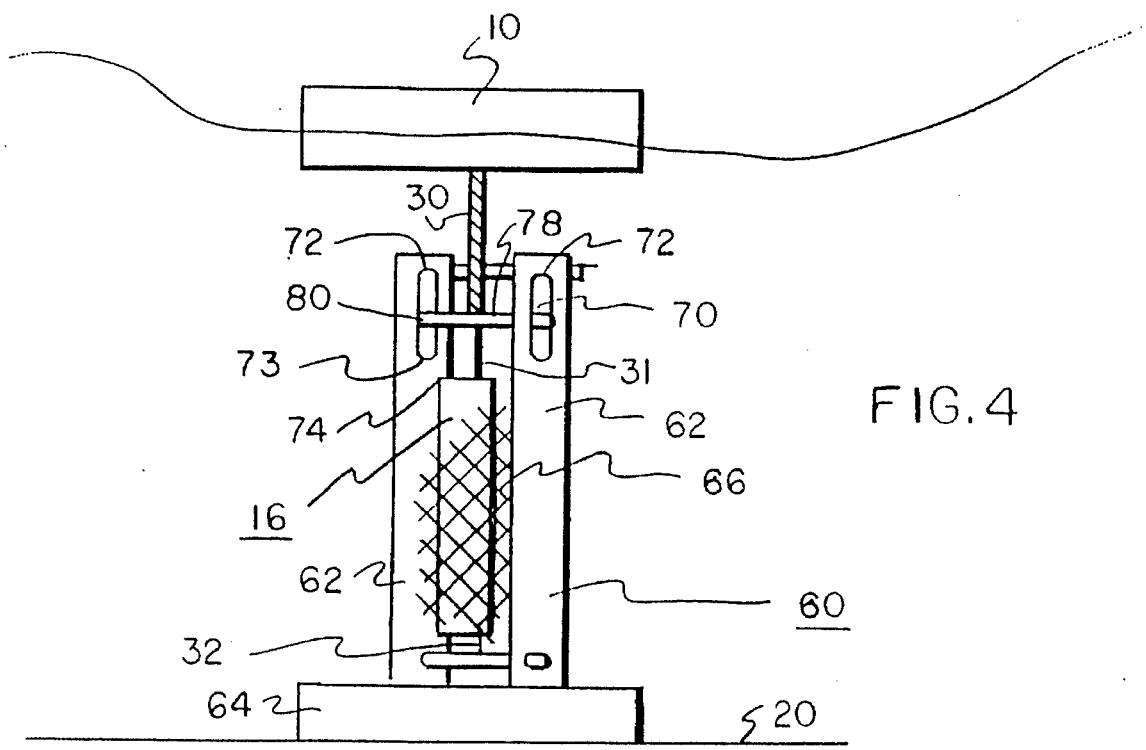
FIG. 4 is a view similar to FIG. 1 but showing a different embodiment of the invention.

Another embodiment of the invention is shown in FIG. 4 where the protective means comprises a solid structure 60 firmly anchored to the ocean floor 20. In this embodiment, the protective structure comprises two side by side rigid columns 62 adjacent to which is disposed a piezoelectric element 16. The piezoelement 16 can be identical to the element 16 shown in FIG. 1 and includes an upper cable 30 for suspending the element 16 from a float 10 and a lower cable 32 for anchoring the element 16 to the floor 20.

As illustrated, both the protective structure columns 62 and the piezoelectric element 16 are secured to a common anchor structure, e.g., a solid, heavy block 64. As previously described, in use of the power generating system, the piezoelectric element (or elements) is stretched between a vertically movable float and a firmly secured anchor. The larger the system, and the larger the float induced vertical forces, the larger is the anchor required. One known technique for forming extremely large and heavy anchors comprises sinking hollow forms onto a water body floor and then pumping concrete into the forms. Concrete is quite heavy and relatively chemically inert, hence is ideal for underwater use.

The use of concrete, or similar type, anchors is particularly advantageous in connection with the embodiment illustrated in FIG. 4 because the rigid columns 62, or other shaped structure, e.g., hollow cylinders or facing C-shaped columns, etc., can be formed simultaneously with the concrete anchor structure 64.

As shown in FIG. 4, the piezoelectric element 16 is enclosed by a protective screen 66 mounted on the columns 62. This protects the element 16 against underwater moving objects.

For providing protection against over-straining of the piezoelectric element 16, each column 62 is provided with a vertically extending slot 70 having an upper end 72 and a lower end 73. The two slots 70 are identically vertically positioned, are disposed adjacent to the upper end 74 of the piezoelectric element, and are of a length equal to a preselected permitted range of vertical straining and destraining of the element 16.

Rigidly secured adjacent to the upper end 74 of the piezoelectric element 16, e.g., by being clamped to the element supporting upper cable 30, is a solid and rigid stress transferring member, e.g., a solid steel bar 78. In this embodiment, the bar 78 is connected to the element 16 by a cable 31. The bar 78 has two free ends 80 each of which extends into a respective slot 70. The dimensions of the bar ends 80 and of the slots 70 are such that the bar ends 80 are completely freely movable in vertical directions within the slots 70 except at such times when the bar ends 80 engage the upper 72 or lower 73 ends of the slots. In effect, the combination of the bar 78 and the slots 70 comprises a mechanical clutch for automatically engaging and disengaging the piezoelectric element 16 from the protective structure 60.

Although not shown, two or more preferably identical piezoelectric elements can be disposed between (or within) the protective means. Conveniently, all the upper ends of the plural piezoelectric elements are connected to a common bar 78 which is secured to the cable 30 suspended from the float 10. The lower ends of all the piezoelectric elements are secured to a common anchor structure.

In normal use of the system, i.e., in connection with normal waves not tending to over-strain the piezoelectric element 16, the upper end 74 of the element 16 is alternately pulled upwardly as the float rises and is elastically pulled downwardly as the float falls in response to passing waves. In such normal usage, the bar ends 80 likewise move up and down within their respective slots 70 but do not contact the ends 72 and 73 of the slots. The piezoelectric element 16, during such normal use, is effectively decoupled from the protective structure.

Conversely, when excessively high waves occur, the bar ends 80 are pulled into contact with the slot upper ends 72 which immediately prevent further vertical rise of the bar ends 80 and the upper end 74 of the piezoelectric element 16 rigidly secured to the bar 78. The float induced vertical stresses are thus immediately transferred to the protective structure which, in this embodiment, completely absorbs the stresses for presenting any further straining of the piezoelectric element 16. Depending upon the elasticity and length of the upper cable 30, the float 10 will continue to rise some amount while not further straining the piezoelectric element.

When the float begins to fall and reaches a height within the normal range of operation of the system, the bar ends 80 disengage from the slot upper ends 72, thus decoupling the piezoelectric element 16 from the protective structure 60.

Normal operation, and generation of electrical energy, then occurs in response to the elastic de-straining of the element 10 until the element 16 is substantially completely de-strained. Conveniently, at this level of the element upper end 74, the bar ends 80 engage the lower ends 73 of the slot. Thus, with continued falling of the float within excessively deep wave troughs, the protective structure 60 supports the weight of the piezoelectric element 16 and prevents it from excessive tilting and possible entanglement with adjoining structures or adjoining piezoelectric elements.

Figure 5:
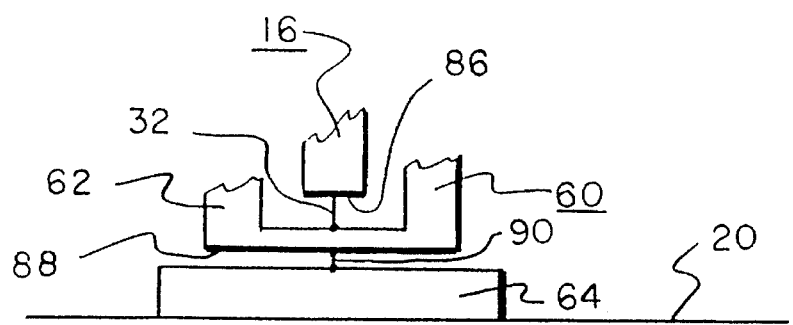
FIG. 5 is a view of a lower portion of a system such as shown in FIG. 4 but showing a modification thereof.

Other modifications are possible. FIG. 5 shows the lower end 86 of the piezoelectric element 16 and the lower end 88 of the protective structure 60 connected in common to the anchor structure 64 by a short, quite strong and inelastic cable 90. This allows tilting of the entire system in response to lateral movements of the float on the water surface. Other known connecting means, e.g., a shaft rotating in a bearing, allowing pivoting of the system within a plane, or a ball and socket arrangement, allowing unimpeded pivoting, and the like, can be used. An arrangement allowing tilting of the system is generally preferred because it provides a simple means for accommodating the overall system to changing mean water levels, e.g., in response to passing tides. Thus, if the system is designed to have a small amount of tilt, i.e., with the axis of elongation of the system, including that of the upper cable 30, being at a small angle to the vertical (the angle being a function of the relationship between mean water level changes and the depth of the body of water), the normal mean water level straining of the system is substantially maintained in spite of mean level changes. With such changes, which occur relatively slowly, the change in vertical distance between the float 10 and the bottom anchor is accommodated by a small rotation of the entire system relative to a vertical axis. With changes in tilt of the system, small changes in the dynamics of operation also occur, e.g., the direction of the straining vector along the piezoelectric element relative to the vertical direction, but such changes are relatively small and increasingly smaller with increasing depths of water.

By way of example, the piezoelectric element 16 shown in the drawings has a Young's Modulous of elasticity of $318 \times 10^3$ psi. All the other anchoring members, e.g., the various cables 30, 32 and 40 (FIG. 1) 44 and 48 (FIG. 3) and 90 (FIG. 5), and the protective structure 60 (FIG. 4) all have much higher moduli of elasticity, e.g., at least $25 \times 10^6$ psi and preferably higher. The greater the difference in elasticity between the piezoelectric element (or elements) and the other anchoring members, the more efficient are the systems both for protecting the element 16 and making maximum use of the wave heights for straining only the element 16 and not the other anchoring members.

What is claimed is:

1. A piezoelectric power generating system for use in a body of water overlying a floor, the system comprising a float for vertical movements in response to passing waves on the surface of the water body, a piezoelectric power generating element for being suspended between said float and said floor and subject to vertical stresses caused by said float in response to passing waves tending to lift said float, and protective means for absorbing float caused vertical stresses for preventing straining of said element in excess of a preselected amount.

2. A system according to claim 1 including means for coupling said float caused stresses to said protective means only when the straining of said element is approximately equal to said preselected amount.

3. A system according to claim 2 wherein said protective means comprises flexible cable means for being suspended between said float and a rigid anchoring means, and said cable means being of such length as to be slack until said float is lifted by a passing wave to a first height above which straining of said element above said preselected amount would occur.

4. A system according to claim 3 wherein the elasticity of said flexible cable means is sufficiently low as to prevent any significant further lifting of said float above said first height.

5. A system according to claim 3 wherein said protective means and said piezoelectric element have respective lower ends both of which are connected to a common link for securing said lower ends to a common anchoring means.

6. A system according to claim 2 wherein said protective means comprises a rigid member having a lower end for being secured to said floor, and said coupling means comprises a rigid stress transferring member secured to said element adjacent an upper end thereof, said rigid member having a stop means at a preselected vertical height above said floor, and said stress transferring member being freely vertically movable with respect to said rigid member over a preselected range of straining of said element and engaging said stop for effecting said float caused stress coupling to said rigid member.

7. A system according to claim 6 wherein said rigid member has a vertically extending slot therein having a closed upper end, and said stress transferring member fits within said slot for free vertical movement therein until limited for further vertical movement by engagement with said slot closed upper end.

8. A system according to claim 7 wherein said slot has a closed lower end engageable by said stress transferring member for transferring support of the weight of said piezoelectric element from said float to said rigid member when said float falls to a preselected depth above said floor.

9. A system according to claim 6 wherein said rigid member is of poured concrete and forms an integral portion of an anchoring structure resting directly on said floor.

10. A system according to claim 2 wherein said protective means comprises a rigid member having a lower end, and including means for rotatably securing said lower end and a lower end of said piezoelectric element to said floor for allowing tilting of said protective means and said element relative to a vertical axis in response to changes in the mean depth of the water body.

11. A method of operating a power generating system comprising a float floating on a surface of a body of water and a piezoelectric power generating element suspended from said float and anchored under a preset stress to the floor of the water body, the method comprising coupling all of float induced increased stresses arising in response to passing surface waves tending to lift the float directly through said piezoelectric element for causing straining of said element, and then, when the straining of said element has reached a pre-selected amount, connecting a stress absorbing member in parallel with said piezoelectric element for substantially absorbing all of further increases in said float induced stresses for substantially preventing further increases in the straining of said piezoelectric element.

12. A method according to claim 11 including, when said further increased float induced stress have reached a maximum and have thereafter begun to decrease, in response to the crest of a passing wave beginning to move past said float, disconnecting said stress absorbing member for allowing coupling of all of the float induced, now decreasing stresses through said piezoelectric element for allowing destraining of said element.

\* \* \* \* \*